United States Patent [19]
Hulse

[11] 3,975,257
[45] Aug. 17, 1976

[54] APPARATUS FOR REMOVING PARTICLES AND CHEMICALS FROM A FLUID SOLUTION

[76] Inventor: Murlin L. Hulse, R.R. 1 - M62, Cassopolis, Mich. 49031

[22] Filed: Feb. 25, 1974

[21] Appl. No.: 445,222

[52] U.S. Cl. .......................... 204/299 R; 204/130; 204/149; 204/150; 204/180 R
[51] Int. Cl.² .................... C25B 7/00; C25D 15/02
[58] Field of Search ............... 204/180 R, 299, 150, 204/149, 181, 130, 106, 152

[56] References Cited
UNITED STATES PATENTS

| | | | |
|---|---|---|---|
| 614,617 | 11/1898 | Milligan | 204/152 X |
| 3,544,458 | 12/1970 | Sato | 210/65 |
| 3,687,834 | 8/1972 | Candor | 204/186 |

*Primary Examiner*—Donald L. Walton
*Assistant Examiner*—A. C. Prescott
*Attorney, Agent, or Firm*—Robert E. Browne; Leo J. Aubel

[57] ABSTRACT

An apparatus for removing undesirable particles, such as metal and fiberglass, and harmful chemical forms, such as acid etchants, from a fluid solution having container means at least partially formed from a plastic electret material disposed in contacting relationship with the solution and carrying an electrostatic charge which causes the particles in the solution to adhere to the surface of the container formed from the material. The container means include a receiving tank having baffles spaced therealong, a filter assembly having filter cartridges to remove foreign matter from the solution and a holding tank, each of the tanks and the shell of the filter being formed from the plastic electret material. The holding tank includes a metal chip assembly placed in contact with the solution and chemically reactive with etchants in the solution to neutralize them. A method of removing particles and chemical compounds from a fluid solution by: passing the solution over a plastic electret material disposed adjacent the path of flow of the solution such that the solution comes in contact with the surface of the electret material which carries an electrostatic charge and thereby causes the particles to adhere to it; and, holding the solution in the presence of metallic chips to neutralize the chemical compounds.

14 Claims, 7 Drawing Figures

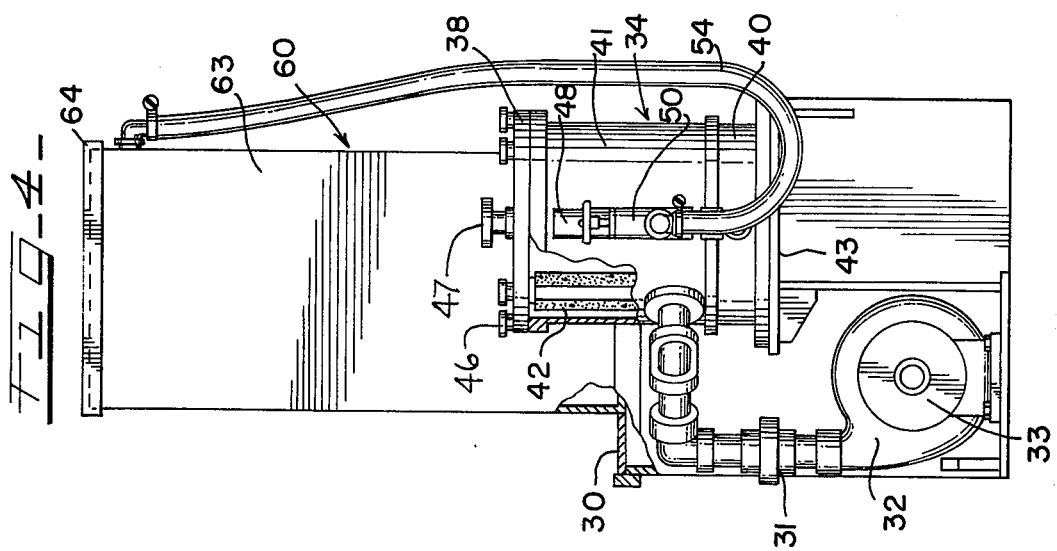
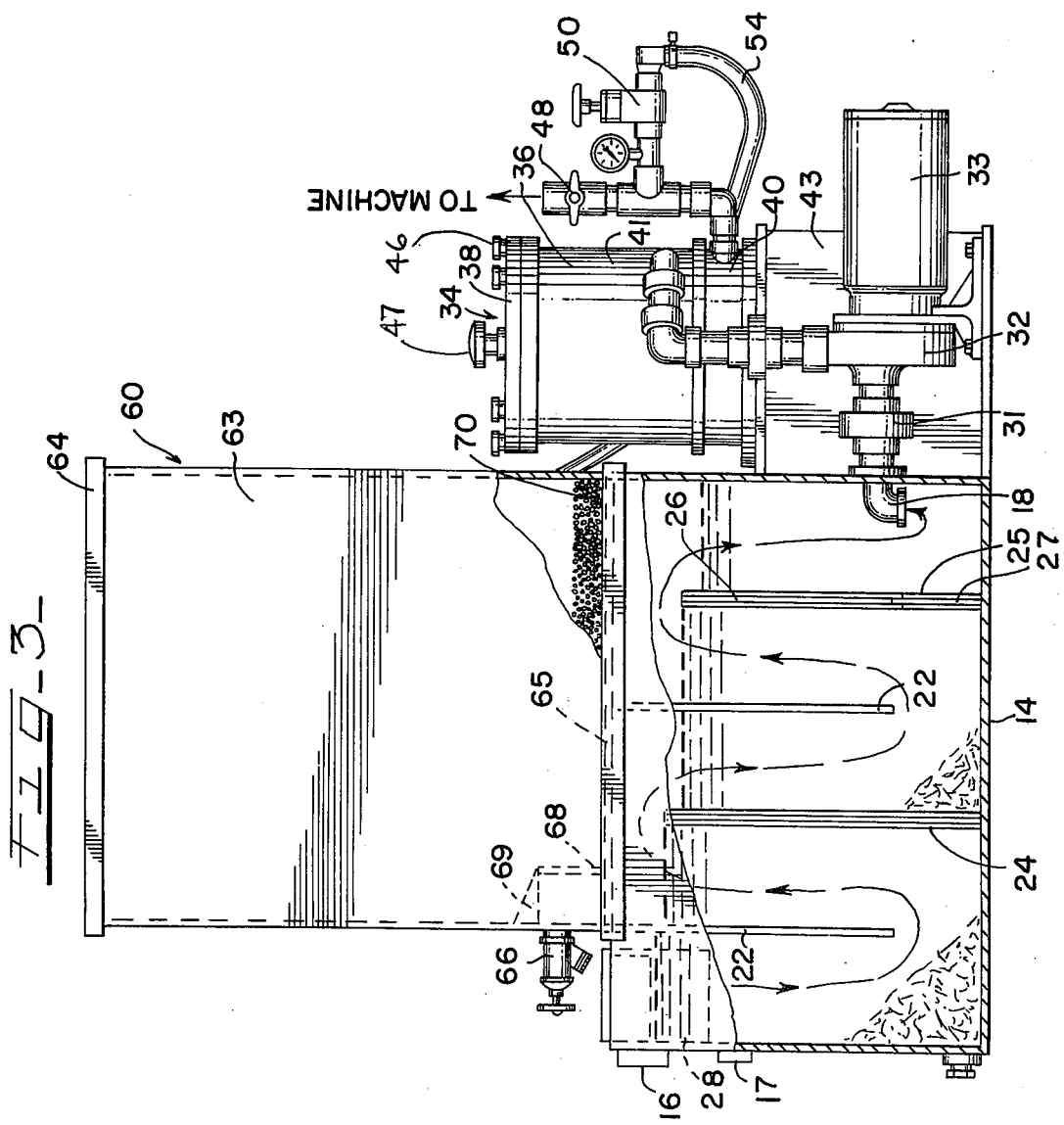

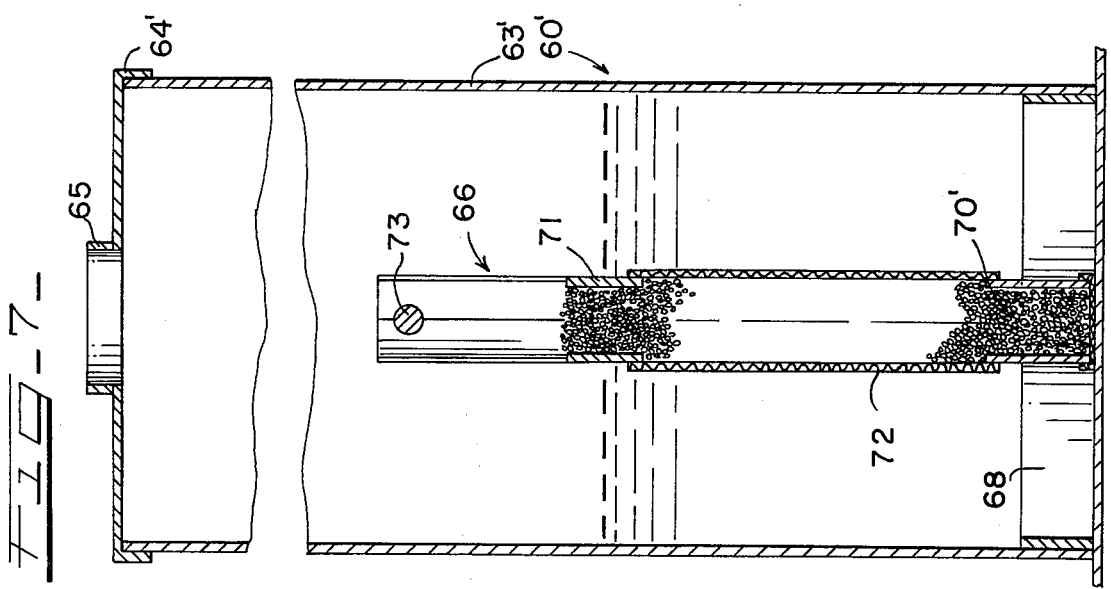
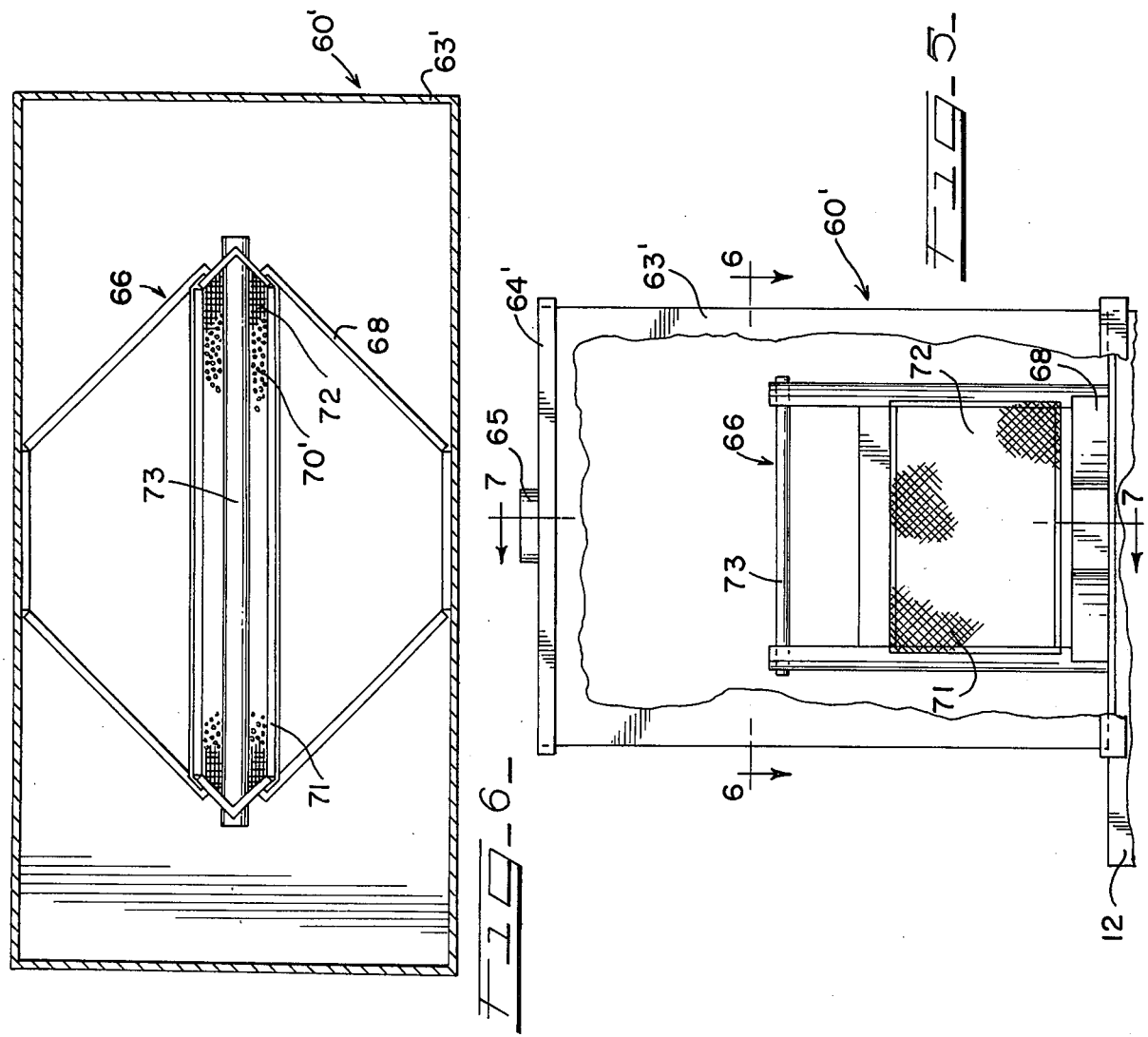

APPARATUS FOR REMOVING PARTICLES AND CHEMICALS FROM A FLUID SOLUTION

BACKGROUND OF THE INVENTION

This invention relates to a method and apparatus for removing particles of metal, fiberglass, etc., from solutions used in industrial or manufacturing processes and also neutralizing corrosive chemicals normally present in such solutions to permit the reuse or disposal of such solutions.

In the production of printed circuit boards and in a variety of similar manufacturing processes, the boards are etched in etching baths containing highly acidic and corrosive chemicals. Water or other fluid solutions are then used to remove etchant residue, oxides, machining chips, copper burrs and fiberglass fibers from the article. This is most commonly done in a mechanical scrubber in which rotating brushes loosen these particles which are carried off in a flow of rinse water, which also acts as a lubricant. Due to increased quality control standards in the manufacturing process and increasingly restrictive environmental and safety regulations and standards limiting the reuse and disposal of rinsing or washing solutions contaminated by chemicals, copper or other active metallic wastes or fiberglass fibers, it has become necessary to remove the optimum amount of acids, metal and fibers possible from these fluid solutions to permit their reuse and conserve water, and, in particular, to allow disposal in either private municipal sewerage systems or adjacent bodies of water.

Various methods have attempted to obtain neutralization of acids and removal of metallic and fibrous particles, the most common being similar to that used in electrostatic precipitators used as air filters to remove particulate carbon matter. For example, in the U.S. Pat. No. 2,944,952 to McMinn, Jr., oppositely charged metal plates are used to remove polymers from solution. In Wadsworth, U.S. Pat. No. 3,196,095, a complex series of parallel plates are used in the desalinization of seawater to remove solids in solution by means of opposite charges on the plates. Finally, in J. T. Candor, U.S. Pat. No. 3,687,834, oppositely charged electrodes are located near exits of a fluid conduit to create a plurality of alternately arranged non-uniform fields across the flowing fluid so that particles will enter the exits adjacent the more intense portion of the non-uniform fields.

Previous attempts to remove copper or other metals have been unsophisticated at best and have generally not been able to rapidly treat a washing solution to obtain an acceptable copper and fiber content for recycling or disposal. For example, if the washing solution is simply run over aluminum chips at a rate sufficient to meet the needs of the manufacturing process, insufficient metal is removed. If the solution is retained in a holding basin with the aluminum chips, an extremely long and inefficient retention time is required to remove a substantial amount of the metal. Previous attempts to neutralize acid etchant residues by the addition and mixing of precise amounts of chemicals have been equally time consuming and expensive, requiring constant chemical analysis, or unscientific, and do not produce an environmentally acceptable result.

Thus, the prior art attempts are not only relatively complex and expensive in manufacture or operation, but also often fail to reduce the levels of acids or metal in the solution sufficiently to allow the solution to be immediately recycled or disposed in the environment.

SUMMARY OF THE INVENTION

This invention involves a method and apparatus for neutralizing etching agents, and separating metallic and fibrous particles and particulate matter from a fluid solution to reduce the particle level in such solution and condition the solution to permit its reuse in a manufacturing process and its ultimate disposal without adverse effects to the environment. This invention accomplishes optimum removal of such etchants, particles and other foreign matter by means of a simple, inexpensively manufactured and easy to operate apparatus having a permanently charged electrostatic means, which preferably includes a plastic material carrying an electrostatic charge, known as an electret, placed adjacent and in contact with the fluid solution discharged from the manufacturing process. The particles which contact or come near the electret will adhere to its surface and thereby efficiently remove themselves from the solution. The etching agents are neutralized by a chemical reaction with an arrangement of a metal element. This invention also conditions the rinsing solution by screening, settling and filtration to remove sediment and other particulate matter.

This apparatus preferably includes a receiving tank or container having its side walls formed from an electret material and having a series of baffles extending between the side walls and transverse to the path of flow of the fluid through the container. The baffles are also formed from the electret material. The fluid rinsing solution containing the metallic particles, fibers and particulate matter and etchant residue will thereby be forced in a circuitous and turbulent path through the container, falling over the baffles and causing metal and particulate matter to settle out and a great percentage of particles which would otherwise not be separated to be removed by the electret material. The initially treated solution is discharged from this container into a filter means having a generally cylindrical shell formed from similar electret means, which surrounds a plurality of cylindrical filters having a large number of extremely small openings. Not only will further metallic particles adhere to the interior of the shell of the filter means, but the filter cartridges will also remove undesirable foreign matter from the solution.

From the filter means, the solution may be recycled directly to the manufacturing process to be reused in washing the manufactured articles to remove metal chips or the like. Alternately and additionally, the solution may be transferred to a holding tank means whose walls are also formed of the electret means. Here, a volume of the solution may be retained for a selected period of time. This holding tank means has a number of metal chips, such as aluminum, preferably contained in a generally vertical, rectangular basket arrangement to expose the optimum area of aluminum surface to the solution. Such chips not only provide surfaces on which the remaining metal in solution may plate out, but also chemically react with the etchant to neutralize it. This tank also removes particles by means of its electrostatically charged plastic walls. After this final treatment step, the original acid, metal snd fiber content of the fluid will have been reduced to a level which is completely acceptable under government regulations for discharge to nearby streams or sewerage systems.

It is significant that the plastic electret sheets used in this invention are not specially charged, selected or designed, and are not arranged relative to one another to create an electric field. Rather, commercial supplies of polypropylene sheets assembled in a random manner have been used.

Accordingly, it is an object of the present invention to provide a method and apparatus which removes particles from a fluid solution by causing such particles to adhere electrostatically to a portion of such apparatus.

It is a further object of the present invention to provide a method and apparatus which neutralizes etching chemicals contained in a fluid solution.

It is another object of this invention to provide an apparatus for removing particles from a fluid solution which is at least partially formed from a plastic electret material disposed in contacting relationship with the fluid solution to attract such particles to its surface.

It is one more object of the present invention to provide an apparatus for removing particles from a fluid solution and neutralizing chemicals in the solution, which has a receiving tank to receive such solution, a filter means in communication with the receiving tank to filter the solution and a holding tank containing an ion-exchanging metal, each at least partially formed of an electret material to remove such particles prior to discharge of the solution.

It is still another object of the present invention to provide an apparatus for removing particles from a fluid solution formed from a plastic electret material carrying an electrostatic charge which is increased by the frictional action of the solution flowing over it.

These and other important objects of the present invention will become apparent in the following description taken in conjunction with the drawings illustrating a preferred embodiment wherein:

FIG. 3 is a partially cut away front elevational view of the apparatus shown in FIG. 1;

FIG. 4 is a partially cut away right side elevational view of the apparatus shown in FIG. 1.

FIG. 5 is a front view showing an alternate holding tank structure for use in the apparatus shown in FIG. 1;

FIG. 6 is a horizontal cross-sectional view of the holding tank shown in FIG. 5 taken generally along line 6—6 thereof; and, FIG. 7 is a side cross-sectional elevational view of the holding tank shown in FIG. 5 taken generally along line 7—7 thereof.

DESCRIPTION OF THE INVENTION

Figure 1:
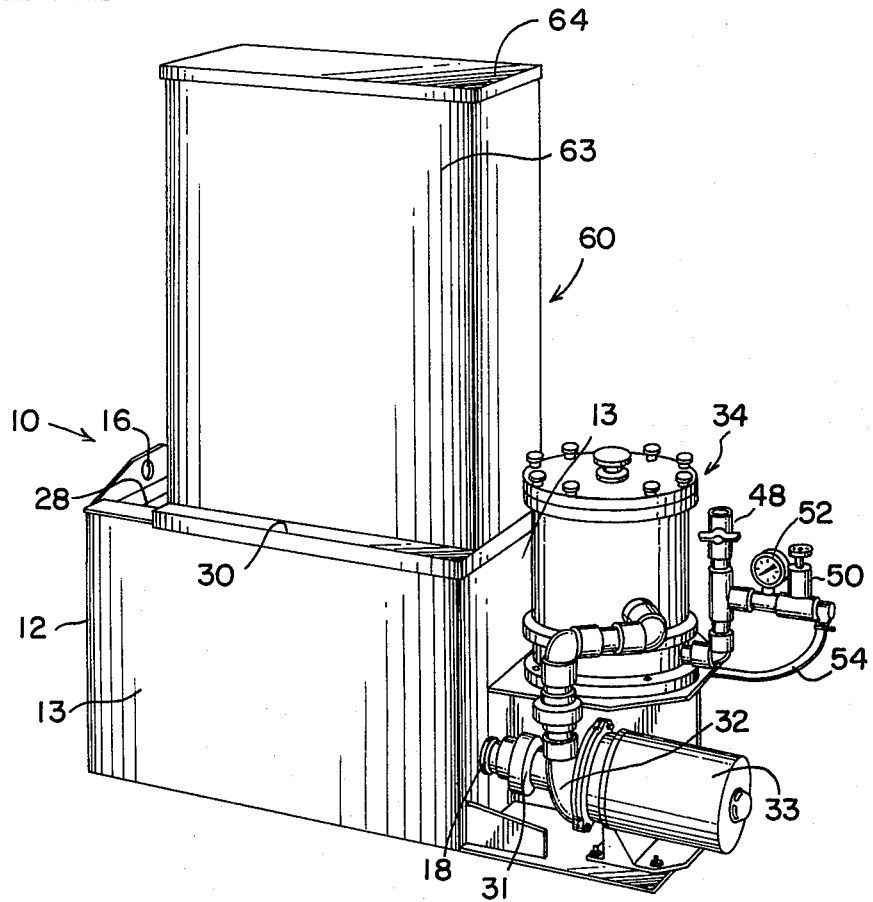
FIG. 1 is a perspective view of the apparatus for removing metallic particles from a fluid solution set forth in this invention.

Referring now to the drawings, and in particular to FIG. 1, the apparatus for removing particles and neutralizing etchants in a fluid solution according to the method of this invention is shown in general at 10. This apparatus 10 includes a lower or receiving tank assembly 12 to initially receive the fluid solution containing the metallic and fiber particles and chemicals which are to be removed. Receiving tank 12 is constructed in a generally rectangular configuration having side walls 13 and a bottom wall 14. At one end of tank 12 is located an inlet 16 which leads from the machine or process in which the fluid solution is used.

This invention was particularly developed for use in the removal of copper chips and neutralization of acid residues which are obtained during the manufacture of printed circuit boards. During the manufacturing process, the printed circuit boards are etched, normally with an acid, then cleaned and scrubbed by mechanical scrubbers, sanders and deburring machines while being rinsed with a water washing solution to remove acid residue, loose copper chips and loose fiberglass fibers from the surface of the board. This process requires three or more gallons of water per minute depending on the number of boards and amount of copper, and unless the copper and fibers are removed from the washing solution, it cannot be recycled to be reused, resulting in tremendous waste and increased costs. Moreover, because of recent legislation in the environmental area including water quality and occupational safety standards, the wash water cannot be either recycled or discharged to nearby sewers or lakes because of its high copper and acid content.

The present invention was therefore developed to solve these problems and, while it is directed to removal of copper and/or chemical etchants, it can easily be used to remove any other particles which may be held by an electrostatic charge and thereby separated from a solution.

At the opposite end of the rectangular receiving tank 12 and near the lower portion thereof, an outlet 18 discharges the solution treated in the tank. Between the inlet and outlet, and spanning the opposite side walls 13 of the tank, are placed a number of downwardly extending stationary baffles 22 and upwardly extending, removable baffles 24 and 25. Baffle 24 is a one-piece upwardly movable baffle which may be set in a sliding manner in parallel vertical tracks formed in the walls of the tank 12. Baffle 25 is a split baffle having a normally stationary bottom portion 27 and a movable upper portion 26 for reasons which will be explained below.

As the washing water enters tank 12 through inlet 16, it is forced to pass through a removable screen tray 28 formed of a fairly fine mesh screen such as No. 40 screen. This screen tray 28 serves to remove larger chips or copper, paper, circuit board fiber or other foreign matter from the wash water and assists in keeping the water as clear as possible for removal of the smaller particles of copper.

The position of the baffles 22, 24 and 25 within tank 12 forces the solution into a circuitous path of flow falling through a number of levels created by the baffle height and causing turbulence within the receiving tank 12 and increasing the contact of the solution with the tank walls and the baffles and the frictional forces exerted on them by the solution. This increased contact and friction significantly increases the removal performance and capacity of the present invention as will be explained shortly. The flow path also promotes conventional settling out of particles.

The present invention is effective and efficient where previous attempts have failed or have been unfeasible because of the discovery that formation of all or a part of the walls and baffles of the receiving tank 12 and, if desired, the other units, from a plastic, electrostatically charged material called an electret will result in the removal of copper from the washing solution, as it is passed over such material, and reduction of the copper content of the solution to a level significantly below that required for reuse of the solution or its disposal.

As explained in U.S. Pat. No. 3,458,731 to Perlman, et al., certain dielectric materials will carry an electrostatic charge and form the electric analog of a permanent magnet called an electret. Any electret-forming plastic is suitable for use in the present invention; however, those having a high carbon content and subject to carrying a greater charge for a longer time period, such as polypropylene, polytetrafluoroethylene (sold under the trademark "TEFLON" by DuPont), and polyethylene, are preferable. The material ultimately used will depend upon the desired cost and the efficiency required. For example, nylon is relatively inexpensive but will not hold particles as well as TEFLON. Simple trial and error experimentation will disclose the material best suited for a particular application.

As the fluid solution containing the copper enters the tank 12, it is forced into contact with the walls and baffles of the tank, which are formed from the electret material. The induced turbulence in the tank causes a frictional force to be developed on the electret surfaces, thereby increasing the electrostatic charge on these surfaces and increasing the amount of copper and fiberglass fibers which may adhere to and be plated out on these surfaces. The flow path will also cause eddies near the corners of the tank and the baffles, as shown in FIG. 3, allowing a longer contact time between the copper in solution and the electret material and therefore increasing the opportunity of attraction. In addition, the flow pattern in tank 12 will also cause copper, fibers and other matter to settle to the tank bottom. Thus, by the time the fluid solution reaches the outlet 18 of the tank, a great percentage of the copper and fibers will have been removed from the solution.

The initially treated solution is then discharged through a pipe 31, which may be formed of any suitable material such as polyvinylchloride, and pumped into a filter assembly 34. Pumping is accomplished by a conventional water pump 32 preferably capable of 30–40 gallons per minute at 30 p.s.i. The pump may be powered by a motor 33 of approximately 3/4 h.p., 3450 r.p.m., 230–460 volts, 60 HZ, 3 phase, and should have a thermal overload protection, a stainless steel shaft and corrosion resistant parts. Both these units are commercially available.

Filter assembly 34 is supported on mounting 43 and includes a cylindrical housing or shell 36 having a cover 38, both of which are formed from a plastic electret material similar to that used in the receiving tank 12. The housing 36 is divided into an upper filter holding portion 41 and a lower collector portion 40. The upper portion 41 contains a plurality of generally cylindrical, commercially available disposable fiberglass filter cartridges 42, as shown in FIG. 4, which are vertically disposed in a circular arrangement within portion 41. This unique circular arrangement allows the use of more cartridges than previous designs and provides a lightweight, very efficient unit. A center knob 47 is connected to a central interior mounting post and a plurality of peripheral hold down knobs 46 are spaced to seal the cover 38 against the pressure within the assembly. The water is forced through the filter cartridges 42 and down into the separate lower collector portion 40 of housing 36. These cartridges 42 are preferably designed to remove particles larger than 125 microns (0.0049 in.) and have openings decreasing in size as the solution is forced radially inward through each cartridge 42 by the pump pressure. In simple filtration, it might be expected that copper and fiber particles would quickly accumulate to block the small filter openings, but it has been found that a large number of such particles still in solution tend to adhere to the inside walls of the electret formed housing 36, thereby increasing the effective life of the fiberglass filter cartridges 42. A pressure gauge 52 is provided, however, so that when the pressure reading drops below 20 p.s.i., it is an indication that the filters are being clogged.

At this point, the copper and particulate matter larger that 125 microns has been removed from the solution so that it can be recycled to the manufacturing operation and be reused as a rinsing solution. This removal will include about 95% of the copper. It has been found that, by use of this invention, this recycling procedure may be repeated at a flow rate of at least 3 gallons per minute for more than 6 consecutive days/week without requiring cleaning of the tanks. By scaling the size of the tanks upward, it is possible to accommodate increased rates of flow.

Figure 2:
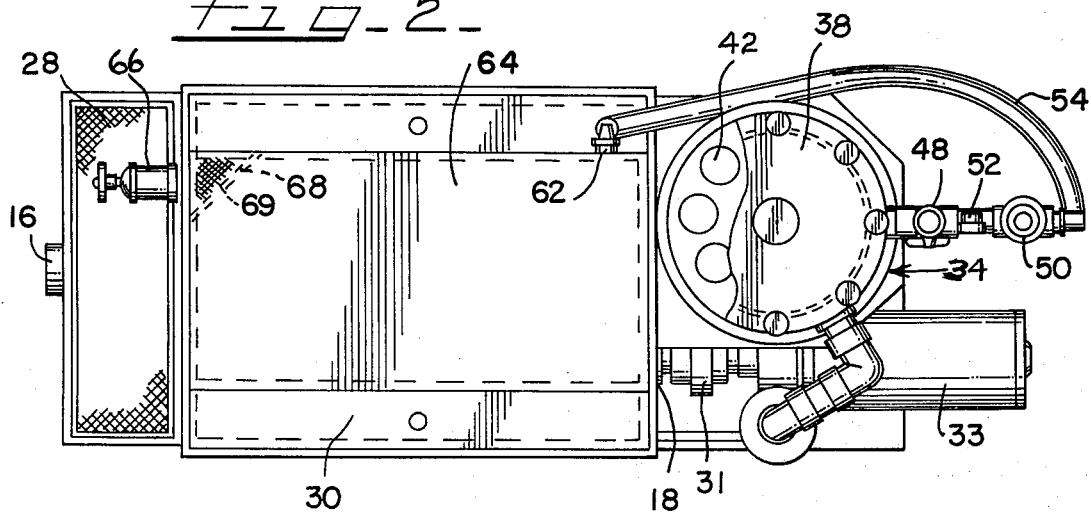
FIG. 2 is a slightly enlarged top plan view of the apparatus shown in FIG. 1.

When it is desired to discharge the rinsing solution or to clean the tank 12 and filter 34, the ball valve 48, which can be set to allow a selected, proper rate of flow back to the manufacturing operation, is closed and gate valve 50 is opened to allow the initially treated and filtered rinsing solution to pass through flexible tube 54 to the top of a holding or upper tank assembly 60, having a drain valve 66 in closed condition. This upper tank assembly 60 has a cover 64 and walls 63 also formed of a plastic electret material similar to that described above. In the embodiment of this invention shown in FIGS. 2–4, the bottom of this tank is covered with small, machined metallic chips 70, such as aluminum, in an arrangement similar to those used alone in prior attempts to remove copper from rinsing solutions. These metallic chips 70 provide a large amount of surface area onto which copper and other particles remaining in the solution and not removed in either tank 12, filter assembly 34 or on the walls 63 of the holding tank 60 will, over a period of time, settle or be plated out. The period of retention in tank 60, which has a capacity similar to that of lower tank 12, may be varied depending on the amount of copper originally contained in the rinsing solution, but has been found to be at an optimum at about 5 days. The embodiment of this invention shown in FIGS. 5–7 illustrates an alternative and novel holding tank assembly 60', which may be used alone, but preferably is used in connection with the above described receiving tank 12 and filter assembly 34. Holding tank assembly 60' is designed not only to remove copper by use of chips, as is known, but also, for the first time, provides a means to quickly, simply and efficiently neutralize or otherwise render acceptable the etching agent residues, such as acids and the like, normally contained in a rinsing solution from a manufacturing process involving etching. Tank 60' has a removable cover 64' and walls 63' formed of a plastic electret material, and a gas vent 65. Centrally disposed within the tank 60' is a basket assembly 66 which includes a hexagonal support frame 68, extending between the walls 63' of tank 60', a vertical, generally rectangular basket 71, and a handle 73. The basket 71 has its opposite sides and bottom formed by stainless steel wire screen 72 welded to the plastic material from which the remainder of the assembly 66 is constructed. The basket 66 is filled with metallic chips, strips or shavings 70 formed from aluminum or other active metals. When tank 63' is filled with etchant contaminated solution, the basket arrangement provides optimum exposure of the metal to the etchant. The aluminum chips will chemically react with the acid etchant to effectively neutralize the etchant and render the solution safe for disposal. The gaseous by-products of this reaction should be vented from the plant through vent 65. The amount of time required to eliminate the etchant residue is usually very short, on the order of two hours, but will increase with the amount and strength of etchant present. The solution in tank 60' may then be discharged to the sewer by opening drain 66'.

It is believed that deposition of copper onto the metal chips and destruction of the corrosive etchant compounds occurs as follows. When the aluminum or other suitable active metal comes into contact with the copper solution, a galvanic cell having opposite electrode potentials will be formed spontaneously. In such a cell the active aluminum ions will tend to enter the acidic electrolytic solution leaving electrons behind in the remaining metal which will then tend to attract copper ions from the solution to reduce them to metallic copper. The active aluminum also tends to liberate or replace hydrogen ions in the acid and produce a metallic compound, water and gases. While the term "neutralization" has been used throughout this application, the aluminum chips, particularly in the embodiment shown in FIGS. 5–7, more truly act to control the pH of the fluid solution to adjust it to an acceptable value of between approximately 6.5 and 8.0.

To clean accumulated copper and fibers from the walls and baffles of the lower tank 12, panels 30 on tank 12 are removed and movable baffle 24 and upper baffle 26 are manually raised. Pump 32 is then actuated to pump the rinsing solution from lower tank 12 to upper tank 60 through hose 54. When the water level in tank 12 is reduced to the level of outlet 18, pump 32 is shut off. The lower portion 27 of the movable baffle 25 remains in place until such time as an entire cleaning is desired, so that any sludge in the bottom of the tank 12 will not enter the pump. With side cover panels removed and the rinsing solution retained in upper tank 60 or 60', the walls and baffles of the lower tank are squeegeed off to remove the copper and fiber coating which has accumulated on them. Copper will form about 43% of this coating, and fiberglass fibers the remainder. This accumulation may be discarded or itself treated to reclaim valuable copper or metal. When the lower tank has been squeegeed and the copper-fiber coating removed, the electrostatic charge on the electret returns to its original level of efficiency. After a predetermined retention period, the solution in upper tank or 60' may be drained out drain 66 through a conventional garden hose to the sewer. Upper tank 60 or 60' has a weir 68 and a screen 69 upstream of drain 66 to prevent accidental removal of the aluminum chips or foreign matter with the discharge of the treated solution. After the water is discharged from the upper tank, the lower tank may be filled through inlet 17 with fresh water from the plant up to a fill level to provide a sufficient volume of water to develop a flow through the entire apparatus. The apparatus is now prepared to begin recycling rinsing water once more.

It has been found, through testing, that a rinsing solution originally containing approximately 18 parts per million of copper, well beyond most applicable standards, will, after treatment by the present invention as described above, be reduced to not more than 1.0, and often as low as 0.2 parts per million. It has also been found that using only the lower tank assembly 12 and the filter assembly 34 to recycle a rinsing solution continuously, this invention can be operated continuously up to two weeks without cleaning and still produce acceptable results. The frequency of cleaning and purging the present invention required depends upon the amount of metal going into the tanks, which will in turn depend upon the rate and volume of the manufacturing operation. The metal chips used in upper tank 60 should be electrochemically active and replaced as needed when the upper tank is cleaned, approximately every 3 months. As described, this invention is approximately 50 inches long by 20 inches wide by 52 inches high, and may be simply installed in a minimum of space by hook-up to existing connections. Formed of the plastic electret material described, this invention weighs less than 150 pounds.

It is clear from the foregoing description that this invention is capable of many variations and structural changes without departing from its basic principles. It should therefore only be limited by the scope of the appended claims.

I claim:

1. An apparatus for removing metal, fibers and other particles from a fluid solution, normally produced during a manufacturing operation involving the rinsing of such particles and etchants from the manufactured article, including recycling tank means for receiving and containing a volume of said fluid solution, said recycling tank means having a bottom wall, side walls, an inlet to allow said fluid solution to flow thereinto, and an outlet through which said fluid solution may be discharged, a substantial portion of at least said side walls of said recycling tank means being formed of plastic electret material capable of retaining a static electrical charge on its surfaces to thereby cause said metal, fibers and other particles contained in said fluid solution flowing therethrough to adhere to and be retained on said side walls and effectively removed from said fluid solution, filter means, in communication through suitable conduit means with said outlet of recycling tank means, for removing particulate matter from said fluid solution, said filter means having a housing, a plurality of filter cartridges mounted within said housing, said cartridges acting to remove additional particles from said solution, such that said solution may be discharged from said filter means in a condition suitable for reuse in the manufacturing operation.

2. The apparatus of claim 1 wherein said recycling tank means includes baffles formed from said plastic electret material extending between said side walls thereof and juxtaposed between said inlet and said outlet of said recycling tank means, said baffles causing said fluid solution to flow in a circuitous path through said recycling tank thereby creating turbulence in the flow of said fluid solution through said recycling tank means and correspondingly increasing the amount of particles settling out in said recycling tank means.

3. The apparatus of claim 2 wherein the flow of said fluid solution through said recycling tank means creates frictional forces over the surfaces of said recycling tank means formed of electret material, which forces act to increase the electrostatic charge retained by said electret material and to thereby increase the ability of said surfaces to retain said particles from said fluid solution thereon.

4. The apparatus of claim 2 wherein said plastic electret material has a relatively high carbon content by percentage analysis.

5. The apparatus of claim 2 wherein said plastic electret material is polypropylene.

6. The apparatus of claim 2 wherein said plastic electret material is polytetrafluoroethylene.

7. The apparatus of claim 1 wherein said housing of said filter means is cylindrical in configuration and divided into an upper filtering chamber and a lower filtrate chamber, said upper chamber including an inlet for receiving said fluid solution from said recycling tank means, said filter cartridges being disposed in a circular arrangement in said upper chamber, and internally communicating with said lower chamber to allow said solution to be forced, under pressure, through said filter cartridges and into said lower chamber.

8. The apparatus of claim 7 wherein said housing includes a removable cover having a center hold down nut attached to a center shaft located generally along a central axis of the housing and a plurality of circularly arranged outer nuts spaced about the periphery of said cover to resist the pressure created within said housing.

9. The apparatus of claim 1 including holding tank means in communication with said filter means to receive treated and filtered fluid solution from said filter means, said holding tank means containing a metallic charge therein which, over a selected period of time, acts to remove metallic particles remaining in said fluid solution after treatment in said recycling tank means and said filter means, while simultaneously acting to neutralize etchants in said solution to permit said solution to be safely disposed of in a sewerage system.

10. The apparatus set forth in claim 9 wherein said holding tank means is formed of a plastic electret material carrying an electrostatic charge such that particles will adhere to a surface of said material.

11. The apparatus set forth in claim 9 wherein said holding tank means includes porous basket means having a plurality of metallic chips contained in a generally vertical arrangement therewithin to expose an optimum surface area of said chips to said fluid solution and thereby promote, over a selected period of time, the plating out of said metal particles on said chips and the reaction of said metal forming said chips with said etchant contained in said solution to neutralize said etchant and control the pH of said solution.

12. An apparatus for removing undesirable particles and corrosive etchants from a fluid solution to reduce the amounts of such particles and etchants in said solution to levels acceptable for disposal, including, in series, recycling tank means for receiving said fluid solution from a manufacturing or similar operation in untreated form, filter means in communication with said recycling tank means to receive said fluid solution from said recycling tank means after treatment therein, said filter means having a plurality of filter cartridges disposed therein for removing small suspended particles, such as metal, fibers and the like, from said fluid solution treated in said recycling tank means, and holding tank means having a metallic charge contained therein and in communication with said filter means for receiving said fluid solution after treatment in said recycling tank means and filtration in said filter means from said filter means and retaining said fluid solution for a selected period of time in the presence of said metallic charge contained therein, at least substantial portions of interior surfaces of said recycling tank means, said filter means and said holding tank means, which come in contacting relationship with said fluid solution flowing therethrough, being formed of a plastic electret material capable of retaining an electrostatic charge, said electret material thereby causing contacting particles to adhere to said interior surfaces of said recycling tank means, said filter means and said holding tank means formed from said material and thereby be removed from said fluid solution, said metallic charge in said holding tank means reacting with said etchant to break it down such that said fluid solution is reusable or disposable.

13. The apparatus of claim 12 wherein said holding tank means includes a removable porous basket having a plurality of metallic chips contained in a generally vertical arrangement therewithin to expose an optimum surface area of said chips to said fluid solution and thereby promote, over a selected period of time, the plating out of said metal particles contained in said fluid solution on said chips and the neutralization of said etchant in said fluid solution to control the pH of said solution.

14. The apparatus set forth in claim 12 wherein said plastic electret means is formed of a material having a high carbon content by percentage analysis.

* * * * *